(12) United States Patent
Tsuji et al.

(10) Patent No.: US 10,029,209 B2
(45) Date of Patent: Jul. 24, 2018

(54) EXHAUST GAS PURIFICATION MATERIAL

(71) Applicant: CATALER CORPORATION, Kakegawa-shi, Shizuoka (JP)

(72) Inventors: Makoto Tsuji, Kakegawa (JP); Hiroto Imai, Kakegawa (JP); Shintaro Kobayashi, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 18 days.

(21) Appl. No.: 15/037,356

(22) PCT Filed: Dec. 5, 2014

(86) PCT No.: PCT/JP2014/082319
§ 371 (c)(1),
(2) Date: May 18, 2016

(87) PCT Pub. No.: WO2015/087816
PCT Pub. Date: Jun. 18, 2015

(65) Prior Publication Data
US 2016/0279571 A1 Sep. 29, 2016

(30) Foreign Application Priority Data
Dec. 11, 2013 (JP) .................................. 2013-255818

(51) Int. Cl.
*F01N 3/10* (2006.01)
*B01D 53/94* (2006.01)
(Continued)

(52) U.S. Cl.
CPC ..... *B01D 53/9418* (2013.01); *B01D 53/9459* (2013.01); *B01D 53/9472* (2013.01);
(Continued)

(58) Field of Classification Search
CPC ... F01N 3/035; F01N 3/2066; B01D 53/9431; B01D 2255/2073; B01D 2255/502
(Continued)

(56) References Cited

U.S. PATENT DOCUMENTS

2009/0087365 A1 4/2009 Klingmann et al.
2010/0115930 A1* 5/2010 Brown .................... F01N 3/035
60/297
(Continued)

FOREIGN PATENT DOCUMENTS

CN 101732991 A 6/2010
CN 103362610 A 10/2013
(Continued)

OTHER PUBLICATIONS

Feb. 10, 2015 International Search Report issued in International Patent Application No. PCT/JP2014/082319.
(Continued)

*Primary Examiner* — Tom P Duong
(74) *Attorney, Agent, or Firm* — Oliff PLC

(57) ABSTRACT

An exhaust gas purification material according to the present invention is provided with a particulate filter that traps particulate matter in exhaust gas and contains an SCR catalyst for adsorbing ammonia and reducing NOx in the exhaust gas. A maximum allowable adsorption amount of ammonia adsorbable by the filter differs between an upstream portion of the filter including an exhaust gas inlet-side end, and an downstream portion of the filter including an exhaust gas outlet-side end. A maximum allowable adsorption amount of ammonia A in the upstream portion is smaller than a maximum allowable adsorption amount of ammonia B in the downstream portion (A<B).

6 Claims, 6 Drawing Sheets

(51) Int. Cl.
  *B01J 29/85* (2006.01)
  *B01J 35/04* (2006.01)
  *F01N 3/20* (2006.01)
  *F01N 3/035* (2006.01)
  *B01J 37/02* (2006.01)
  *B01J 35/00* (2006.01)
  *B01J 29/76* (2006.01)
  *B01J 37/00* (2006.01)

(52) U.S. Cl.
  CPC ...... *B01D 53/9477* (2013.01); *B01J 29/7615* (2013.01); *B01J 29/85* (2013.01); *B01J 35/0006* (2013.01); *B01J 35/04* (2013.01); *B01J 37/0244* (2013.01); *B01J 37/0246* (2013.01); *F01N 3/035* (2013.01); *F01N 3/2066* (2013.01); *B01D 2251/2067* (2013.01); *B01D 2255/1021* (2013.01); *B01D 2255/1025* (2013.01); *B01D 2255/2073* (2013.01); *B01D 2255/2092* (2013.01); *B01D 2255/20738* (2013.01); *B01D 2255/20761* (2013.01); *B01D 2255/50* (2013.01); *B01D 2255/502* (2013.01); *B01D 2255/9032* (2013.01); *B01D 2255/911* (2013.01); *B01D 2255/9155* (2013.01); *B01D 2258/012* (2013.01); *B01J 37/0018* (2013.01); *B01J 37/0036* (2013.01); *B01J 2229/186* (2013.01); *B01J 2229/42* (2013.01); *F01N 2510/0682* (2013.01); *Y02T 10/24* (2013.01)

(58) Field of Classification Search
  USPC .................................. 422/177, 180; 55/523
  See application file for complete search history.

(56) References Cited

U.S. PATENT DOCUMENTS

| | | |
|---|---|---|
| 2011/0030346 A1 | 2/2011 | Neubauer et al. |
| 2011/0052454 A1 | 3/2011 | Kato |
| 2011/0146237 A1 | 6/2011 | Adelmann et al. |
| 2013/0255229 A1 | 10/2013 | Doering |
| 2014/0301923 A1* | 10/2014 | Tang ................ B01D 53/9431 423/212 |

FOREIGN PATENT DOCUMENTS

| | | |
|---|---|---|
| DE | 10 2005 005 663 A1 | 8/2006 |
| EP | 2292904 A2 | 3/2011 |
| JP | 2004-060494 A | 2/2004 |
| JP | 2006-291873 A | 10/2006 |
| JP | 2007-501107 A | 1/2007 |
| JP | 2007-185571 A | 7/2007 |
| JP | 2009-082915 A | 4/2009 |
| JP | 2011-052612 A | 3/2011 |
| JP | 2011-518658 A | 6/2011 |
| JP | 2013-500857 A | 1/2013 |
| JP | 2014-522306 A | 9/2014 |
| WO | 2005/014146 A1 | 2/2005 |
| WO | 2009/124643 A1 | 10/2009 |
| WO | 2011/015615 A1 | 2/2011 |
| WO | 2012/166833 A1 | 12/2012 |

OTHER PUBLICATIONS

Jun. 23, 2016 International Preliminary Report on Patentability issued in International Patent Application No. PCT/JP2014/082319.
Jan. 12, 2018 Office Action issued in Chinese Patent Application No. 201480067269.X.

* cited by examiner

EXHAUST GAS PURIFICATION MATERIAL

TECHNICAL FIELD

The present invention relates to an exhaust gas purification material. More particularly, the present invention relates to an exhaust gas purification material that purifies exhaust gas emitted by an internal combustion engine such as a diesel engine. The present international application claims priority based on Japanese Patent Application No. 2013-255818, filed on Dec. 11, 2013, the entire contents of which are incorporated herein by reference.

BACKGROUND ART

Generally, exhaust gas emitted by internal combustion engines contains, for instance, particulate matter (PM) having carbon as a main component, and ash made up of unburned components, all of which are known to give rise to air pollution. Regulations concerning emissions of particulate matter have become stricter year by year, alongside regulations on harmful components such as hydrocarbons (HC), carbon monoxide (Co) and nitrogen oxides (NOx). Various technologies for trapping and removing particulate matter from exhaust gas have been therefore proposed.

For instance, particulate filters for trapping particulate matter are provided in the exhaust passage of internal combustion engines. In diesel engines, for example, a given amount of particulate matter is emitted together with the exhaust gas. Accordingly, a diesel particulate filter (DPF) is fitted in the exhaust passage. Such particulate filters include known filters, referred to as of wall flow-type, having a structure in which a substrate is made up of multiple porous cells, and in which the inlets and the outlets of the multiple cells are plugged alternately (PTL 1, 2). In a wall flow-type particulate filter, exhaust gas that flows in through cell inlets passes through a porous cell partition wall that separates the cells, and is discharged out through the cell outlets. As the exhaust gas passes through the porous cell partition wall, the particulate matter is trapped within the pores inside the partition wall.

Imparting NOx purification ability to the filter is an approach that has been studied in recent years with a view to further enhancing purification performance. For instance, it has been proposed to provide, in the filter, an SCR (Selective Catalytic Reduction) catalyst that selectively reduces NOx in the exhaust gas as a result of the reducing action of ammonia or the like (PTL 3). In an exhaust gas purification device of urea addition type, for instance, aqueous urea is supplied upstream of a filter that supports an SCR catalyst, whereupon ammonia is generated through hydrolysis of the aqueous urea. The ammonia adsorbs onto the filter, and NOx in the exhaust gas is purified through the reducing action of the adsorbed ammonia.

CITATION LIST

Patent Literature

[PTL 1] Japanese Patent Application Publication No. 2007-185571
[PTL 2] Japanese Patent Application Publication No. 2009-82915
[PTL 3] Japanese Patent Application Publication No. 2004-60494

SUMMARY OF INVENTION

In a filter provided with the above SCR catalyst, performance differences in the NOx purification behavior arise depending on the maximum allowable adsorption amount of ammonia adsorbable by the SCR catalyst. Findings by the inventors have revealed that NOx can be purified efficiently by using an SCR having an amount of maximum allowable adsorption amount of ammonia that is comparatively small, even when using a smaller amount of aqueous urea. This involves however a trade-off in that when a large amount of aqueous urea is added, ammonia left over from NOx purification is discharged to the outside. That is, the slip amount of ammonia might increase upon supply of a larger amount of aqueous urea. In SCR catalysts in which the maximum allowable adsorption amount of ammonia is comparatively large, by contrast little ammonia is discharged to the outside even when a large amount of aqueous urea is added, but aqueous urea must be added to a certain extent to elicit a high NOx purification performance, since the NOx purification performance rises in accordance with the addition amount of aqueous urea. A concern arises, specifically, in that the NOx purification performance might drop upon supply of a smaller amount of aqueous urea to the filter. It has been thus difficult to achieve both high NOx purification and suppression of ammonia discharge in filters that are provided with conventional SCR catalysts.

In the light of the above, it is main object of the present invention to provide a high-performance exhaust gas purification material that combines NOx purification and ammonia emission suppression at a high level, the material being provided with a particulate filter that contains an SCR catalyst.

The exhaust gas purification material according to the present invention is an exhaust gas purification material that is disposed in an exhaust passage of an internal combustion engine, and purifies exhaust gas emitted by the internal combustion engine, the exhaust gas purification material including a particulate filter that traps particulate matter in the exhaust gas and contains an SCR catalyst (for instance, a zeolite) for adsorbing ammonia and reducing NOx in the exhaust gas, wherein a maximum allowable adsorption amount of ammonia adsorbable by the filter differs between an upstream portion of the filter including an exhaust gas inlet-side end, and a downstream portion of the filter including an exhaust gas outlet-side end. A maximum allowable adsorption amount of ammonia A in the upstream portion is smaller than a maximum allowable adsorption amount of ammonia B in the downstream portion (A<B). The term maximum allowable adsorption amount of ammonia denotes herein a maximum value of the ammonia adsorption amount at a time where all adsorption sites of the filter (typically, an SCR catalyst) are covered with ammonia. For instance, the maximum allowable adsorption amount of ammonia can be worked out through calculation on the basis of the usage amount and a basic characteristic (for instance, saturated adsorption amount) of the SCR catalyst.

In the exhaust gas purification material above, the maximum allowable adsorption amount of ammonia in the upstream portion of the filter is smaller than that in the downstream portion, and hence a yet higher NOx purification performance can be elicited, even upon addition of a smaller amount of aqueous urea, in the upstream portion. Further, the maximum allowable adsorption amount of ammonia in the downstream portion is larger than that in the upstream portion, and hence discharge (slip) of ammonia to the outside can be suppressed even upon supply of a larger amount of reducing agent solution, in the downstream portion. Using the above exhaust gas purification material makes it therefore possible to provide a high-performance exhaust gas purification device in which both purification of NOx and ammonia slip suppression can be achieved at a high level.

A value of ratio (B/A) of an ammonia maximum allowable adsorption amount A in the upstream portion and an ammonia maximum allowable adsorption amount B in the downstream portion is not particularly limited, but the effect of enhancing catalytic performance, arising from imparting a difference in the ammonia maximum allowable adsorption amount between the upstream portion and the downstream portion, may fail to be elicited sufficiently when the above value of ratio (B/A) is excessively small. Therefore, the above value of ratio (B/A) ranges suitably from about 1.1 to 3, preferably from 1.1 to 2, and particularly preferably from 1.5 to 1.8.

In a preferred aspect of the exhaust gas purification material disclosed herein, the upstream portion includes a portion corresponding to at least 20% of the length of the filter from an exhaust gas inlet-side end of the filter towards the exhaust gas outlet. A high NOx purification performance can be elicited more reliably in the upstream portion by setting as the upstream portion, a portion corresponding to 20% of the length of the filter from the exhaust gas inlet-side end of the filter towards the exhaust gas outlet. In a preferred aspect, the downstream portion includes a portion corresponding to at least 20% of the length of the filter from the exhaust gas outlet-side end of the filter towards the exhaust gas inlet. Discharge of ammonia in the downstream portion can be suppressed effectively by setting, as the downstream portion, a portion corresponding to 20% of the length of the filter, from the exhaust gas outlet-side end of the filter towards the exhaust gas inlet. By virtue of the above configuration, therefore, a high NOx purification rate can be reliably achieved while suppressing discharge of the ammonia to the outside.

In a preferred aspect of the exhaust gas purification material disclosed herein, the SCR catalyst contained in the upstream portion and the SCR catalyst contained in the downstream portion are qualitatively different. By using thus different materials (types) of SCR catalyst in the upstream portion and the downstream portion it becomes possible to reliably obtain an exhaust gas purification material in which the above value of ratio (B/A) can be realized.

In a preferred aspect of the exhaust gas purification material disclosed herein, the SCR catalyst contained in the upstream portion and the SCR catalyst contained in the downstream portion are qualitatively identical, and the content of SCR catalyst per L of substrate in the upstream portion is larger than the content of SCR catalyst per L of substrate in the downstream portion. Such a configuration boasts high technical value in making it possible to render different the maximum allowable adsorption amount of ammonia between the upstream portion and the downstream portion using only a same type of SCR catalyst, instead of using a plurality of SCR catalysts of different materials (that is, while better exploiting the advantages of using an SCR catalyst of a same material).

In a preferred aspect of the exhaust gas purification material disclosed herein, the filter includes: a substrate of wall flow structure, having inlet cells in which only an exhaust gas inflow end is open, outlet cells adjacent to the inlet cells and in which only an exhaust gas outflow end is open, and a porous partition wall that separates the inlet cells and the outlet cells; an upstream catalyst layer provided within the partition wall in the upstream portion and containing an SCR catalyst; and a downstream catalyst layer provided within the partition wall in the downstream portion and containing an SCR catalyst. The upstream catalyst layer is formed in such a manner that 80 mass % or more of the total amount of the SCR catalyst is present in a portion corresponding to up to 80% of the thickness of the partition wall, from a surface of the partition wall in contact with the inlet cells towards the outlet cells. The downstream catalyst layer is formed in such a manner that 80 mass % or more of the total amount of the SCR catalyst is present in a portion corresponding to up to 80% of the thickness of the partition wall, from the surface of the partition wall in contact the outlet cells towards the inlet cells.

A high NOx purification performance can be brought out more reliably, even upon addition of a small amount of reducing agent solution, by providing the upstream catalyst layer in such a manner that 80 mass % or more (80 mass % to 100 mass %, for instance 80 mass % to 95 mass %) of the total amount of the SCR catalyst is present in a portion corresponding to up to 80% of the thickness of the partition wall, from the surface of the partition wall in contact with the inlet cells towards the outlet cells. Further, discharge of ammonia to the outside can be suppressed effectively, even upon addition of a large amount of reducing agent solution, by providing the downstream catalyst layer in such a manner that 80% or more (80 mass % to 100 mass %, for instance 80 mass % to 95 mass %) of the total amount of the SCR catalyst is present in a portion corresponding to up to 80% of the thickness of the partition wall, from the surface of the partition wall in contact with the outlet cells towards the inlet cells. By virtue of the above configuration it becomes therefore possible to achieve a high NOx purification rate while suppressing ammonia slip.

The present invention provides an exhaust gas purification device that includes the exhaust gas purification material described above. The exhaust gas purification device includes any one of the exhaust gas purification materials disclosed herein, and reducing agent solution supply part for supplying a reducing agent solution (for instance, aqueous urea) for generating ammonia, from upstream of the exhaust gas purification material, in the exhaust passage. The above configuration allows realizing a high-performance exhaust gas purification device corresponding to a wide range of addition amount of reducing agent solution.

DESCRIPTION OF EMBODIMENTS

Preferred embodiments of the present invention will be explained next with reference to accompanying drawings. Any features other than the features specifically set forth in the present description and which may be necessary for carrying out the present invention (for instance, general features pertaining to the arrangement of particulate filters in automobiles) can be regarded as instances of design matter for a person skilled in the art on the basis of known techniques in the technical field in question. The present invention can be realized on the basis of the disclosure of the present description and common technical knowledge in the technical field in question.

Figure 1:
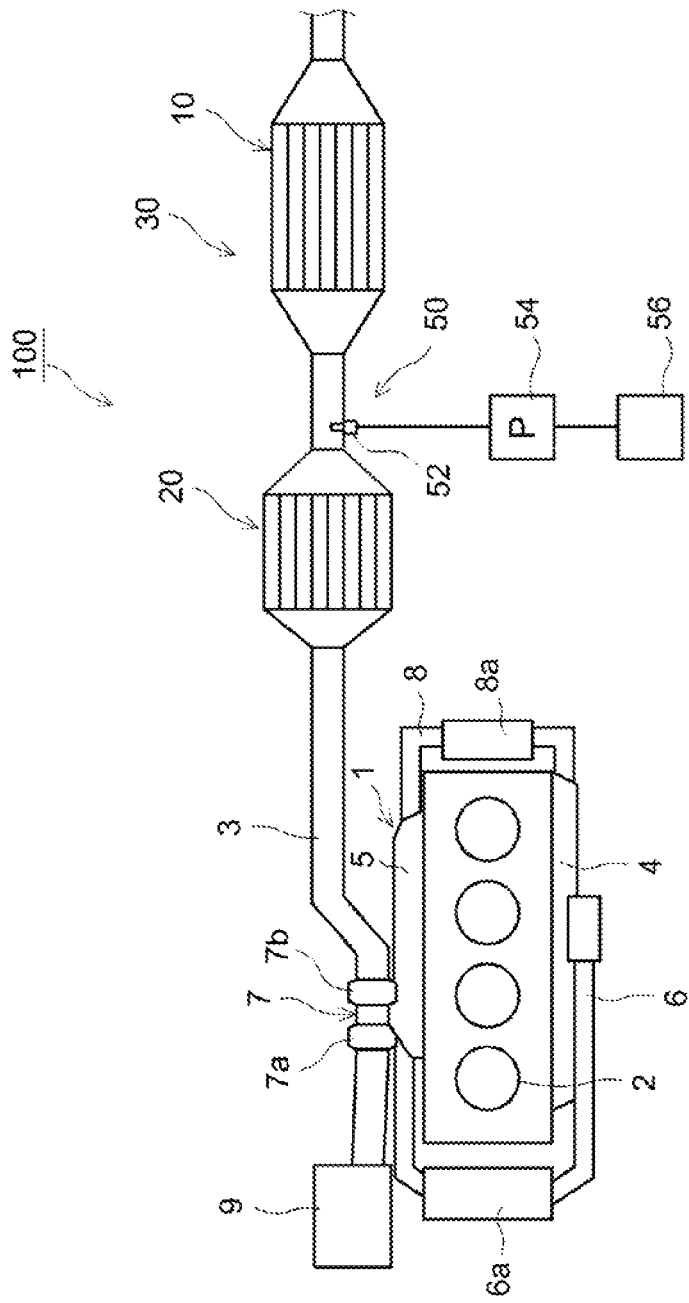
FIG. 1 is a diagram illustrating schematically an exhaust gas purification device according to an embodiment.

As illustrated in FIG. 1, an exhaust purification device 100 according to the present embodiment is used in a diesel engine 1 as an internal combustion engine. The configuration of the diesel engine 1 will be explained briefly first. The diesel engine 1 explained below is merely an example of the internal combustion engine according to the present invention. The exhaust purification device according to the present invention can be used also in an internal combustion engine (for instance, a gasoline engine) other than the diesel engine 1 that is explained below.

The diesel engine 1 is typically provided with a plurality of combustion chambers 2 and fuel injection valves (not shown) that inject fuel into respective combustion chambers 2. The combustion chambers 2 communicate with an intake manifold 4 and an exhaust manifold 5. The intake manifold 4 is connected to an outlet of a compressor 7a of an exhaust turbocharger 7, via an intake duct 6. The inlet of the compressor 7a is connected to an air cleaner 9. A cooling device (intercooler) 6a for cooling the air that flows within the intake duct 6 is disposed around the latter. The exhaust manifold 5 is connected to the inlet of an exhaust turbine 7b of the exhaust turbocharger 7. The outlet of the exhaust turbine 7b is connected to an exhaust passage (exhaust pipe) 3 through which exhaust gas flows. The exhaust manifold 5 and the intake manifold 4 are connected to each other via an exhaust gas recirculation passage (EGR passage) 8. An EGR cooling device 8a for cooling EGR gas that flows in the EGR passage 8 is disposed around the latter.

An oxidation catalyst 20, a reducing agent solution supply part 50 and an exhaust gas purification material 30 are disposed in the exhaust passage (exhaust pipe) 3, in this order from an upstream side (left side in FIG. 1) towards the downstream side (right side in FIG. 1). The exhaust gas purification material 30 is provided with a particulate filter (hereafter also simply referred to as filter) 10.

The oxidation catalyst (Diesel Oxidation Catalyst: DOC) 20 is a catalyst having an oxidizing function on components (for instance, CO and HC) in exhaust gas, and may be formed, for instance, out of a monolithic catalyst that supports a noble metal catalyst such as Pt (platinum) or rhodium (Rh). The type of the oxidation catalyst 20 is however not particularly limited. The specific configuration of the oxidation catalyst 20 is not a characterizing feature of the present invention, and, accordingly, will not be explained in detail herein.

Figure 2:
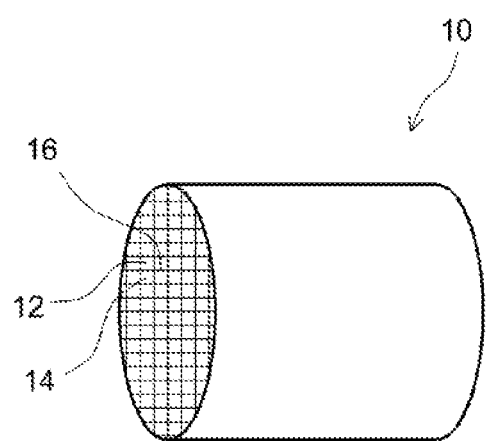
FIG. 2 is a perspective-view diagram illustrating schematically a filter according to an embodiment.

The filter 10 is disposed downstream of the oxidation catalyst 20 in the exhaust pipe 3. FIG. 2 is a perspective-view diagram of the filter 10. The filter 10, which is a porous filter capable of trapping particulate matter (PM) contained in the exhaust gas, is provided with multiple pores through which PM cannot pass. By supporting an SCR (Selective Catalytic Reduction) catalyst, the filter 10 is configured to purify nitrogen oxides (NOx) in exhaust gas. Examples of SCR catalysts include, for instance, zeolite catalysts and vanadium catalysts. Zeolite catalysts are not particularly limited, and include, for instance, β-zeolite supporting a metal element, silicoaluminophosphate (SAPO)-based zeolites, ZSM-5 zeolites, Cu—Y zeolites and the like. Examples of suitable zeolite structures include, for instance, AEI, AFT, AFX, AST, BEA, BEC, CHA, EAB, ETR, GME, ITE, KFI, LEV, THO, PAU, UFI, SAS, SAT and SAV, in the nomenclature of the International Zeolite Association. The foregoing may be used singly or in combinations of two or more types. Examples of metal elements supported on the above zeolites include copper and/or iron. Particularly preferably there are used, for instance, SAPO-based zeolites that support copper and β-zeolites that support iron.

As illustrated in FIG. 1, the reducing agent solution supply part 50 is disposed upstream of the filter 10 in the exhaust pipe 3. The reducing agent solution supply part 50 supplies a reducing agent solution (herein, aqueous urea) for generating ammonia, from upstream of the filter 10 in the flow direction of the exhaust gas. In the present embodiment, the reducing agent solution supply part 50 is provided with a spray nozzle 52, a pump 54 and a tank 56. The spray nozzle 52 is connected to the tank 56 via the pump 54. The pump 54 supplies aqueous urea from within the tank 56 to the spray nozzle 52. The aqueous urea supplied to the spray nozzle 52 is sprayed into the exhaust pipe 3, flows downstream together with inflowing exhaust gas from upstream in the exhaust pipe 3, and hydrolyzes into ammonia. The ammonia adsorbs onto the filter 10 (typically, an SCR catalyst), and NOx in the exhaust gas is purified through the reducing action of the adsorbed ammonia.

In the filter 10 provided with the above SCR catalyst, performance differences in the NOx purification behavior arise depending on the maximum allowable adsorption amount of ammonia adsorbable by the SCR catalyst. That is, NOx can be efficiently purified, even using a smaller amount of aqueous urea, in an SCR catalyst where the maximum allowable adsorption amount of ammonia is comparatively small, but this involves a trade-off in that when a large amount of aqueous urea is added, ammonia left over from NOx purification is discharged to the outside. That is, the slip amount of ammonia might increase upon supply of a larger amount of aqueous urea. On the other hand, in SCR catalyst in which the maximum allowable adsorption amount of ammonia is comparatively large, little ammonia is discharged to the outside even when a large amount of aqueous urea is added, but aqueous urea must be added to a certain extent to elicit a high NOx purification performance, since the NOx purification performance rises in accordance with the addition amount of aqueous urea. A concern arises, specifically, in that the NOx purification performance might drop upon supply of a smaller amount of aqueous urea to the filter.

Findings by the inventors have revealed that in order to bring out a NOx purification function immediately at an upstream portion after addition of urea it is effective to use an SCR catalyst having an amount of maximum allowable adsorption amount of ammonia that is comparatively small. When an SCR catalyst an amount of maximum allowable adsorption amount of ammonia that is comparatively small is used in the entire filter 10 in order to purify NOx efficiently, a trade-off arises in that the ammonia left over from purification of NOx is discharged to the outside when a large amount of aqueous urea is added. Accordingly, in order to preclude discharge of ammonia to the exterior even upon supply of a large amount of aqueous urea, it is effective to use an SCR catalyst having a comparatively large maximum allowable adsorption amount of ammonia in the downstream portion, so that as much ammonia as possible can be held in the downstream portion.

On the basis of the above finding, the inventors decided to prescribe different maximum allowable adsorption amounts of ammonia for the upstream portion and the downstream portion of the filter 10, to achieve as a result a property whereby ammonia is not readily discharged to the outside even upon supply of a larger amount of ammonia, in the downstream portion, and a property whereby the filter exhibits readily a high NOx purification performance even upon supply of a smaller amount of aqueous urea, in the upstream portion.

Figure 3:
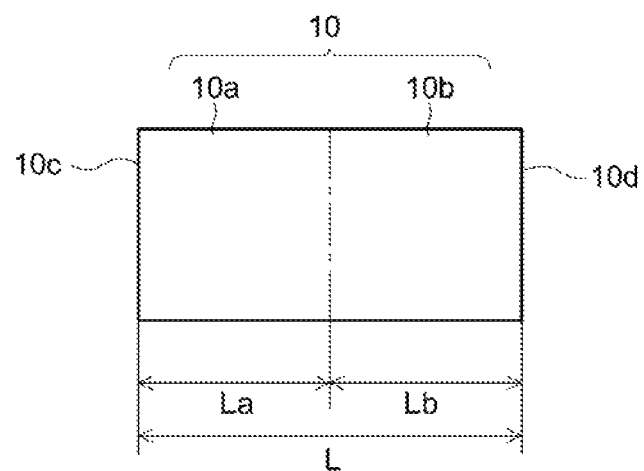
FIG. 3 is a diagram for explaining a filter according to an embodiment.

As illustrated schematically in FIG. 3, the filter 10 according to the present embodiment is made up of an upstream portion 10a and a downstream portion 10b. The upstream portion 10a may be a portion, from an exhaust gas inlet-side end (upstream end) 10c of the filter 10 towards an exhaust gas outlet (downstream side), corresponding to at least 20% (at most 80%) of a total length L of the filter 10 ($0.2L \leq La \leq 0.8L$). The downstream portion 10b may be a portion, from an exhaust gas outlet-side end (downstream end) 10d of the filter 10 towards the exhaust gas inlet (upstream side), corresponding to at least 20% (at most 80%) of the total length L of the filter 10 ($0.2L \leq Lb \leq 0.8L$). In the example illustrated in the figure, the upstream portion 10a is a portion corresponding to 50% of the total length L of the filter 10, from the exhaust gas inlet-side end 10c of the filter 10 towards the exhaust gas outlet ($La=0.5L$). The downstream portion 10b is a portion other than the upstream portion 10a ($Lb=0.5L$).

The upstream portion 10a and the downstream portion 10b of the filter 10 each contain an SCR catalyst. The upstream portion 10a of the filter 10 is configured in such a manner that a maximum allowable adsorption amount of ammonia B in the downstream portion 10b is larger than that in the upstream portion 10a, so as to suppress ammonia slip. The upstream portion 10a of the filter 10 is configured in such a manner that a maximum allowable adsorption amount of ammonia A in the upstream portion 10a is smaller than that in the downstream portion 10b ($A<B$), so as to enhance the NOx purification performance.

The "maximum allowable adsorption amount" of ammonia is worked out herein on the basis of the saturated adsorption amount and usage amount of the SCR catalyst that is supported on the filter 10. Specifically, the maximum allowable adsorption amount of ammonia A (L) per L of substrate in the upstream portion 10a is worked out as $A=Va \times Xa$, where Va (mol/g) denotes the saturated adsorption amount of the SCR catalyst material contained in the upstream portion 10a of the filter 10, and Xa (g) denotes the content of the SCR catalyst material per L of substrate. The maximum allowable adsorption amount of ammonia B (L) per L of substrate in the downstream portion 10b is worked out as $B=Vb \times Xb$, where Vb denotes the saturated adsorption amount of the SCR catalyst material contained in the downstream portion 10b, and Xb denotes the content of the SCR catalyst material per L of substrate.

The maximum allowable adsorption amount of ammonia B in the downstream portion 10b thus obtained may be larger than the maximum allowable adsorption amount of ammonia A in the upstream portion 10a ($A<B$). For instance, the value of ratio (B/A) of the maximum allowable adsorption amount of ammonia A in the upstream portion 10a and the maximum allowable adsorption amount of ammonia B in the downstream portion 10b may be about 1.1 or higher. More preferably, the value of the ratio ranges from 1.1 to 2, and particularly preferably from 1.5 to 1.8. When the difference in the maximum allowable adsorption amounts of ammonia lies within such ranges it becomes possible to achieve effectively both suppression of ammonia slip in the downstream portion 10b and enhancement of NOx purification performance in the upstream portion 10a. An optimal exhaust gas purification device can therefore be realized in which both purification of NOx and ammonia slip suppression can be achieved at a high level.

Although not particularly limited thereto, the maximum allowable adsorption amount of ammonia A in the upstream portion 10a is about 230 mmol/L or lower (for instance, in the range 30 mmol/L to 230 mmol/L), preferably 180 mmol/L or lower (for instance, in the range 50 mmol/L to 180 mmol/L), more preferably 110 mmol/L or lower, and yet more preferably 80 mmol/L or lower, from the viewpoint of achieving both NOx purification and ammonia slip suppression at a high level. The maximum allowable adsorption amount of ammonia B in the downstream portion 10b is about 255 mmol/L or lower (for instance, in the range 50 mmol/L to 255 mmol/L), preferably 190 mmol/L or lower (for instance, in the range 80 mmol/L to 190 mmol/L), more preferably 150 mmol/L or lower (for instance, in the range 95 mmol/L to 150 mmol/L) and yet more preferably 120 mmol/L or lower (for instance, in the range 110 mmol/L to 120 mmol/L).

The maximum allowable adsorption amount of ammonia A in the upstream portion 10a is preferably smaller by 5 mmol/L or more, more preferably smaller by 10 mmol/L or more, than the maximum allowable adsorption amount of ammonia B in the downstream portion 10b, from the viewpoint of better eliciting an effect derived from varying the maximum allowable adsorption amount of ammonia between the upstream portion 10a and the downstream portion 10b. The exhaust gas purification device disclosed herein can be realized preferably in a form where the maximum allowable adsorption amount of ammonia A in the upstream portion 10a is smaller by 20 mmol/L or more (more preferably, by 25 mmol/L or more, for instance by 30 mmol/L or more) than the maximum allowable adsorption amount of ammonia B in the downstream portion 10b. Both NOx purification and ammonia slip suppression can be achieved as a result at a yet higher level.

In the present embodiment, a plurality of types of SCR catalyst is used in the filter 10. Specifically, an SCR catalyst that relatively contributes to increasing the maximum allowable adsorption amount of ammonia and an SCR catalyst that relatively contributes to reducing the maximum allowable adsorption amount of ammonia are used in the filter 10. An SCR catalyst that contributes to reducing the maximum allowable adsorption amount of ammonia is used in the upstream portion 10a of the filter 10, and, conversely, an SCR catalyst that contributes to increasing the maximum allowable adsorption amount of ammonia is used in the downstream portion 10b. That is, the SCR catalyst contained in the upstream portion 10a and the SCR catalyst contained in the downstream portion 10b are qualitatively different. As a result, a difference is imparted between the maximum allowable adsorption amount of ammonia A in the upstream portion 10a and the maximum allowable adsorption amount of ammonia B in the downstream portion 10b in the filter 10. By virtue of such a configuration, an exhaust gas purification material can be easily and reliably obtained that allows realizing the above value of ratio (B/A).

Examples of the SCR catalysts that contribute to eliciting different maximum allowable adsorption amounts of ammonia include, for instance, iron-supporting β-zeolites and copper-supporting SAPO-based zeolites. The maximum allowable adsorption amount of ammonia of the filter 10 varies depending on the type of the zeolite catalyst. In an evaluation of the maximum allowable adsorption amount of ammonia of the filter 10 according to the SCR catalysts that are used in the filter 10, the maximum allowable adsorption amount of ammonia of the filter 10 obeys the order: copper-supporting SAPO-based zeolite>iron-supporting β-zeolite. Accordingly, for instance a copper-supporting SAPO-based zeolite or the like may be used in the SCR catalyst in the downstream portion 10b of the filter 10 in a case where an iron-supporting β-zeolite is used in the SCR catalyst of the upstream portion 10a.

An identical plurality of SCR catalyst types (for example, a copper-supporting SAPO-based zeolite and an iron-supporting β-zeolite) may in some instances be used both in the upstream portion 10a and the downstream portion 10b of the filter 10. In this case, the proportion of the SCR catalyst (for instance, iron-supporting β-zeolite) that contributes to reducing the maximum allowable adsorption amount of ammonia may be higher in the upstream portion 10a of the filter 10 than in the downstream portion 10b. Conversely, the proportion of the SCR catalyst (for instance, copper-supporting SAPO-based zeolite) that contributes to increasing the maximum allowable adsorption amount of ammonia may be higher in the downstream portion 10b of the filter 10 than in the upstream portion 10a. In this case, for instance, the mass proportion of the SCR catalyst (for instance, iron-supporting β-zeolite) that contributes to reducing the maximum allowable adsorption amount of ammonia may be 70 wt % or higher (more preferably 80 wt % or higher, and yet more preferably 90 wt % or higher) in the upstream portion 10a of the filter 10. By contrast, the mass proportion of the SCR catalyst (for instance, copper-supporting SAPO-based zeolite) that contributes to increasing the maximum allowable adsorption amount of ammonia may be 70 wt % or higher (more preferably 80 wt % or higher, and yet more preferably 90 wt % or higher) in the downstream portion 10b of the filter 10.

The filter 10 according to the present embodiment will be explained next in further detail.

Figure 4:
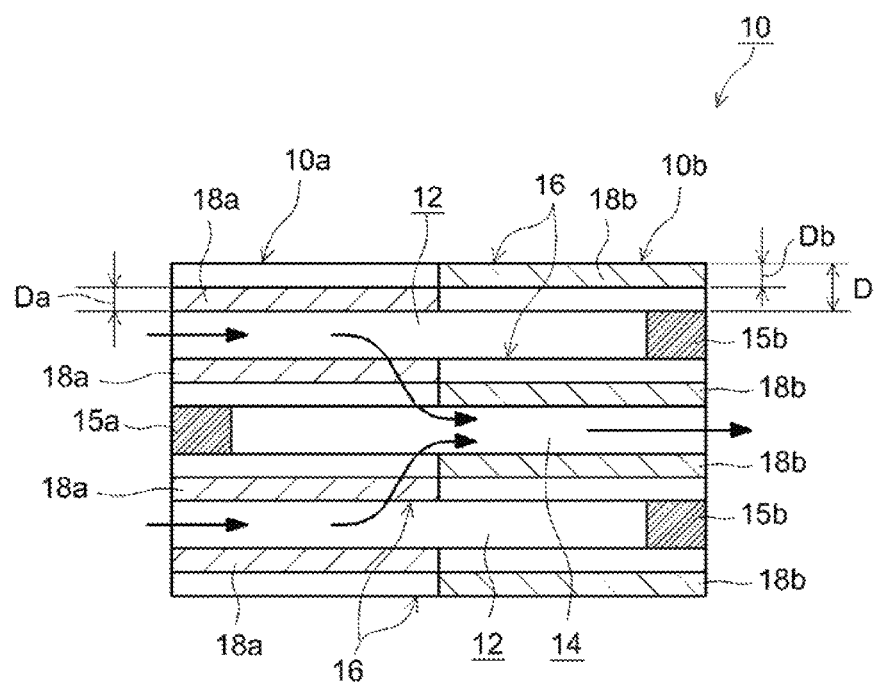
FIG. 4 is a cross-sectional diagram illustrating schematically a filter according to an embodiment.

FIG. 4 is a schematic diagram of an enlarged portion of a cross-section resulting from cutting the filter 10 in the axial direction. As illustrated in FIG. 4, the filter 10 is provided with a substrate of wall flow structure, an upstream catalyst layer 18a and a downstream catalyst layer 18b. The substrate has inlet cells 12 in which only an exhaust gas inflow end is open, outlet cells 14 adjacent to the inlet cells 12 and in which only an exhaust gas outflow end is open, and a porous partition wall 16 that separates the inlet cells 12 and the outlet cells 14. As the substrate there can be used for instance a honeycomb body or the like made of a ceramic such as cordierite or a heat-resistant alloy.

Inlet Cells 12 and Outlet Cells 14

In the inlet cells 12 only the exhaust gas inflow end thereof is open. In the outlet cells 14, which are adjacent to the inlet cells 12, only the exhaust gas outflow end of the outlet cells 14 is open. In this embodiment, the exhaust gas outflow end of the inlet cells 12 is plugged by a sealing section 15a, and the exhaust gas inflow end of the outlet cells 14 is plugged by a sealing section 15b.

Partition Wall 16

The partition wall 16 is formed between the inlet cells 12 and the outlet cells 14 that are adjacent to each other. The inlet cells 12 and the outlet cells 14 are separated by the partition wall 16. The partition wall 16 has a porous structure that allows exhaust gas to pass through. The porosity of the partition wall 16 is not particularly limited, but ranges appropriately from about 50% to 70%, preferably from 55% to 65%. When the porosity of the partition wall 16 is excessively low, PM slips through, whereas when the porosity of the partition wall 16 is excessively high, the mechanical strength of the filter 10 tends to drop, which is undesirable. The thickness of the partition wall 16 is not particularly limited, and may range from about 200 μm to about 800 μm. Within such ranges of thickness of the partition wall an effect is elicited whereby increases in pressure loss are suppressed without incurring losses in PM trapping efficiency.

Upstream Catalyst Layer 18a

The upstream catalyst layer 18a, which is a layer that contains an SCR catalyst, in the upstream portion 10a of the filter 10 described above, is provided inside the partition wall 16. In the present embodiment, the upstream catalyst layer 18a is formed in a portion (½L) corresponding to 50% of the total length L of the filter 10, from the exhaust gas inflow end 10c of the filter 10 towards the downstream side (FIG. 3). The upstream catalyst layer 18a is unevenly distributed within the partition wall 16 in such a manner that the upstream catalyst layer 18a is in contact with the inlet cells 12 and not in contact with the outlet cells 14, in the thickness direction of the partition wall 16. In the present embodiment, the upstream catalyst layer 18a is formed in a portion (Da=½D) corresponding to 50% of a thickness D of the partition wall 16, from the surface of the partition wall 16 in contact with the inlet cells 12 towards the outlet cells 14.

Downstream Catalyst Layer 18b

The downstream catalyst layer 18b, which is a layer containing an SCR catalyst in the downstream portion 10b of the filter 10 described above, is provided inside the partition wall 16. In the present embodiment, the downstream catalyst layer 18b is formed in a portion (½L) corresponding to 50% of the total length L of the filter 10, from the exhaust gas outflow end 10d of the filter 10 towards the upstream side (FIG. 3). The downstream catalyst layer 18b is unevenly distributed within the partition wall 16 in such a manner that the downstream catalyst layer 18b is in contact with the outlet cells 14 and not in contact with the inlet cells 12, in the thickness direction of the partition wall 16. In the present embodiment, the downstream catalyst layer 18b is formed in a portion (Db=½D) corresponding to 50% of the thickness D of the partition wall 16, from the surface of the partition wall 16 in contact with the outlet cells 14 towards the inlet cells 12.

The upstream catalyst layer 18a and the downstream catalyst layer 18b can be formed through coating of the interior of the partition wall 16 with a slurry containing an SCR catalyst (for instance, suction-coating of a slurry under reduced pressure, or spray-coating of a slurry by air blowing). In the process of forming the upstream catalyst layer 18a and the downstream catalyst layer 18b by coating, the slurry may contain a binder in order to cause the slurry to appropriately adhere to the interior of the partition wall 16. For instance silica sol, alumina sol or the like can be preferably used as the binder. The viscosity of the slurry may be adjusted as appropriate by using an organic polymer (for instance, polyvinyl alcohol) in such a manner that the slurry can flow easily into the partition wall 16 of the substrate.

The maximum allowable adsorption amount of ammonia B in the downstream portion 10b is larger than the maximum allowable adsorption amount of ammonia A in the upstream portion 10a (A<B). In this case, for instance, an SCR catalyst (for instance, β-zeolite having iron supported thereon) that contributes to reducing relatively the maximum allowable adsorption amount of ammonia may be used as the SCR catalyst contained in the upstream catalyst layer 18a. Further, an SCR catalyst of relatively high saturated adsorption amount (for instance, SAPO having copper supported thereon) may be used as the SCR catalyst contained in the downstream catalyst layer 18b.

Exhaust gas flows into the filter 10 through the inlet cells 12 of the substrate, as illustrated in FIG. 4. The exhaust gas that flows in through the inlet cells 12 passes through the porous partition wall 16 and reaches the outlet cells 14. The arrows in FIG. 4 denote the route along with the inflowing exhaust gas from the inlet cells 12 reaches the outlet cells 14 through the partition wall 16. The partition wall 16 has a porous structure; as the exhaust gas passes through the partition wall 16, therefore, the PM becomes trapped at the surface of the partition wall 16 and in the pores inside the partition wall 16. Further, the upstream catalyst layer 18a and the downstream catalyst layer 18b containing an SCR catalyst that adsorbs ammonia are provided inside the partition wall 16, and hence NOx in the exhaust gas becomes purified as the exhaust gas passes through the interior and the surface of the partition wall 16. The exhaust gas that reaches the outlet cells 14 through the partition wall 16 becomes discharged out of the filter 10 through an opening on the exhaust gas outflow-side.

In such a filter 10, the maximum allowable adsorption amount of ammonia in the upstream portion 10a is smaller than that in the downstream portion 10b, and hence a high NOx purification performance can be elicited, even upon addition of a small amount of aqueous urea, in the upstream portion 10a. The maximum allowable adsorption amount of ammonia in the downstream portion 10b is larger than that in the upstream portion 10a, and hence ammonia slip can be suppressed, even upon addition of the large amount of reducing agent solution, in the downstream portion 10b. By using the filter 10, it becomes therefore possible to realize an optimal exhaust gas purification device 100 in which both NOx purification and ammonia slip suppression can be achieved at a high level.

The filter 10 according to an embodiment of the present invention has been explained above, but the present invention is not limited to the above embodiment.

In the embodiment described above, for instance, an instance has been illustrated wherein the SCR catalyst contained in the upstream portion 10a and the SCR catalyst contained in the downstream portion 10b are qualitatively different, but the method for imparting different maximum allowable adsorption amounts of ammonia is not limited thereto. For instance, the filter 10 may be configured in such a manner that the SCR catalyst contained in the upstream portion 10a and the SCR catalyst contained in the downstream portion 10b are qualitatively identical, and that the content of the SCR catalyst per L of substrate in the upstream portion 10a is larger than the content of the SCR catalyst per L of substrate in the downstream portion 10b. A difference can be set as a result between the maximum allowable adsorption amount of ammonia A in the upstream portion 10a and the maximum allowable adsorption amount of ammonia B in the downstream portion 10b in the filter 10. In this case, for instance, the content of SCR catalyst per L of substrate in the downstream portion 10b may range from about 1.1 times to about 2 times the content SCR catalyst per L of substrate in the upstream portion 10a. Such a configuration boasts high technical value in making it possible to render different the maximum allowable adsorption amount of ammonia between the upstream portion and the downstream portion using only a same type of SCR catalyst (for instance, copper-supporting SAPO), without using a plurality of SCR catalysts of different materials (that is, while better exploiting the advantages of using an SCR catalyst of a same material (for instance, copper-supporting SAPO)).

Figure 5A:
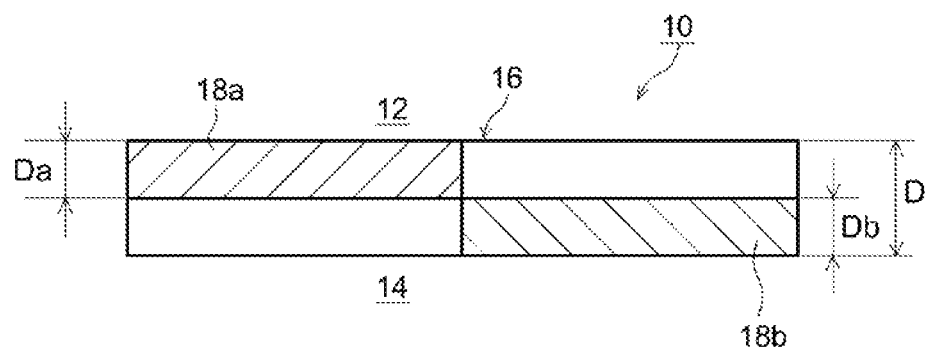
FIG. 5A is a diagram for explaining a filter according to an embodiment.
Figure 5B:
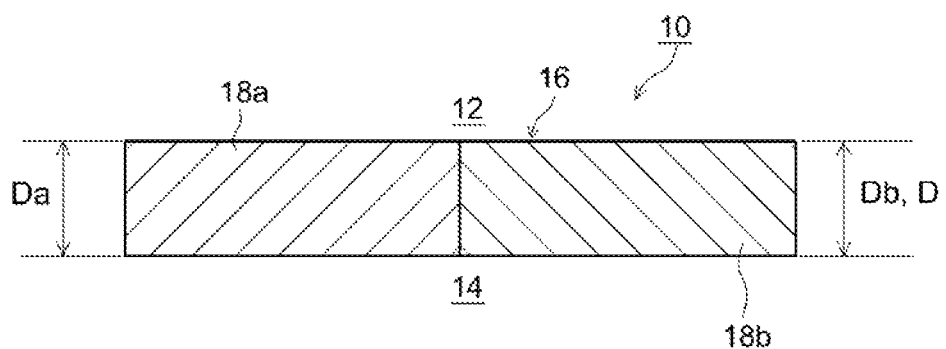
FIG. 5B is a diagram for explaining a filter according to another embodiment.

In the embodiment described above, the thickness Da of the upstream catalyst layer 18a was set to ½ of the thickness D of the partition wall 16, and the thickness Db of the downstream catalyst layer 18b was set to ½ of the thickness D of the partition wall 16 as illustrated in FIG. 5A. However, the thicknesses Da, Db of the upstream catalyst layer 18a and the downstream catalyst layer 18b are not limited thereto. For instance, the upstream catalyst layer 18a may be formed in a portion corresponding to a range of 50% to 100% of the thickness D of the partition wall 16 (preferably, a range of 50% to 80%, i.e. ½ to ⅘ of the thickness of the partition wall), from the surface of the partition wall 16 in contact with the inlet cells 12 towards the outlet cells 14. The downstream catalyst layer 18b may be formed in a portion corresponding to a range of 50% to 100% of the thickness D of the partition wall 16 (preferably, a range of 50% to 80%, i.e. ½ to ⅘ of the thickness of the partition wall), from the surface of the partition wall 16 in contact with the outlet cells 14 towards the inlet cells 12. In this case, the downstream catalyst layer 18b may be formed so as not to overlap the upstream catalyst layer 18a in the thickness direction of the partition wall 16. As illustrated for instance in FIG. 5B, the upstream catalyst layer 18a and the downstream catalyst layer 18b may be formed over the entire thickness D of the partition wall 16 (Da=D, Db=D). For instance, the upstream catalyst layer 18a may be formed in such a manner that 80 mass % or more of the total amount of the SCR catalyst (SCR catalyst contained in the upstream catalyst layer 18a) is present in a portion corresponding to up to 80% of the thickness D of the partition wall 16, from the surface of the partition wall 16 in contact with the inlet cells 12 towards the outlet cells 14. The downstream catalyst layer 18b may be formed in such a manner that 80 mass % or more of the total amount of the SCR catalyst (SCR catalyst contained in the downstream catalyst layer 18b) is present in a portion corresponding to up to 80% of the thickness D of the partition wall 16, from the surface of the partition wall 16 in contact with the outlet cells 14 towards the inlet cells 12. Enhancement of NOx purification performance and ammonia slip suppression can be achieved, at a yet higher level, within the above ranges of the thickness of the upstream catalyst layer 18a and the downstream catalyst layer 18b and of the distribution of the respective SCR catalyst therein.

Figure 5C:
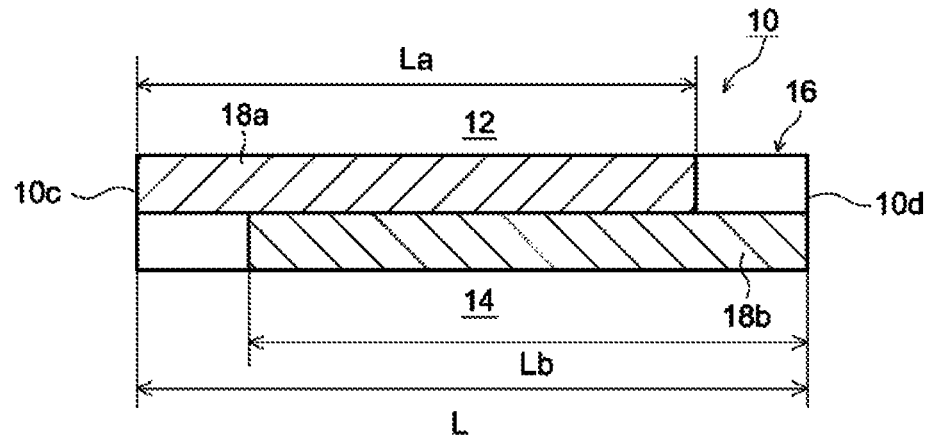
FIG. 5C is a diagram for explaining a filter according to another embodiment.

In the form illustrated in FIG. 5A, the length La of the upstream catalyst layer 18a was set to ½ of the total length L of the filter 10, and the length Lb of the downstream catalyst layer 18b was set to ½ of the total length L of the filter 10. However, the lengths La, Lb of the upstream catalyst layer 18a and the downstream catalyst layer 18b are not limited thereto. For instance, the upstream catalyst layer 18a may be formed in a portion corresponding to at least 20% of the total length L of the filter 10 (at most 80%, i.e. within a range of ⅕ to ⅘ of the substrate as a whole), from the exhaust gas inlet-side end (upstream end) 10c of the filter 10 towards the exhaust gas outlet (downstream side). The downstream catalyst layer 18b may be formed in a portion corresponding to at least 20% of the total length L of the filter 10 (at most 80%, i.e. within a range of ⅕ to ⅘ of the substrate as a whole), from the exhaust gas outlet-side (downstream end) of the filter 10 towards the exhaust gas inlet (upstream side). As illustrated in FIG. 5C, for instance, the upstream catalyst layer 18a may be formed in a portion corresponding to 80% of the total length L of the filter 10 (La=⅘L). The downstream catalyst layer 18b may be formed in a portion corresponding to 80% of the total length L of the filter 10 (Lb=⅘L). In this case, the downstream catalyst layer 18b may be formed so as not to overlap the upstream catalyst layer 18a in the length direction of the filter 10. Enhancement of NOx purification performance and ammonia slip suppression can be achieved, at a yet higher level, within the above ranges of length of the upstream catalyst layer 18a and the downstream catalyst layer 18b.

Figure 5D:
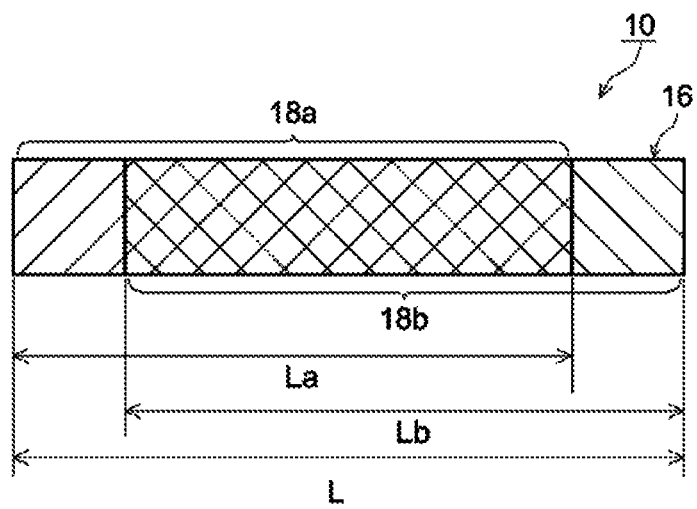
FIG. 5D is a diagram for explaining a filter according to another embodiment.

In the example of FIG. 5A, the upstream catalyst layer 18a and the downstream catalyst layer 18b are formed so as not to overlap. However, the formation pattern of the upstream catalyst layer 18a and the downstream catalyst layer 18b is not limited thereto. As illustrated in FIG. 5D, for instance, the upstream catalyst layer 18a and the downstream catalyst layer 18b may be formed overlapping each other (i.e. in such a manner that the SCR catalyst contained in the upstream catalyst layer 18a and the SCR catalyst contained in the downstream catalyst layer 18b coexist partially). In this case, there hold preferably La=0.2L to 0.8L, Lb=0.2L to 0.8L and L≤La+Lb≤1.6L, where L denotes the total length of the filter 10, La denotes the length of the upstream catalyst layer 18a and Lb denotes the length of the downstream portion 10b. Enhancement of NOx purification performance and ammonia slip suppression can be achieved, at a yet higher level, within the above ranges of length La, Lb of the upstream catalyst layer 18a and the downstream catalyst layer 18b.

Test examples relating to the present invention will be explained next, but the present invention is not meant to be limited to the test examples illustrated below.

Example 1

Herein SAPO having Cu supported thereon was prepared as the SCR catalyst. A slurry A was obtained by charging 200 g of the Cu-supporting SAPO into a solution resulting from mixing 350 g of pure water and 200 g of an $Al_2O_3$ sol (AS200, by Nissan Chemical Industries Ltd.), and by stirring and milling the whole. Also β-zeolite having Fe supported thereon was prepared as an SCR catalyst. A slurry B was obtained by charging 200 g of the Fe-supporting β-zeolite into a solution resulting from mixing 350 g of pure water and 200 g of an $Al_2O_3$ sol (AS200, by Nissan Chemical Industries Ltd.), and by stirring and milling the whole. The viscosity of the slurry A and the slurry B was adjusted through addition of an organic polymer to the slurries (polyvinyl alcohol having a molecular weight of about 5000 was used herein).

Firstly, the exhaust gas inflow end of a cordierite substrate (wall flow-type substrate illustrated in FIG. 2 to FIG. 4: diameter 129 mm, total length 150 mm, volume 2000 $cm^3$, average pore size 25 μm, porosity 60%) was wash-coated with 255 g of the slurry B. The slurry B was next caused to permeate, by air blowing, into the partition wall 16 (in a portion (see FIG. 5A) corresponding to 50% of the length L of the cordierite substrate from the exhaust gas inflow end of the substrate towards the downstream side, being a portion corresponding to 50% of the thickness of the partition wall 16, from the surface of the partition wall 16 in contact with the inlet cells 12 towards the outlet cells 14), with drying and firing, to form as a result the upstream catalyst layer 18a inside the partition wall 16. The exhaust gas outflow end of the above cordierite substrate was wash-coated with 255 g of the slurry A. The slurry A was next caused to permeate, by air blowing, into the partition wall 16 (in a portion (see FIG. 5A) corresponding to 50% of the length L of the cordierite substrate from the exhaust gas outflow end of the substrate towards the upstream side, being a portion corresponding to 50% of the thickness of the partition wall 16, from the surface of the partition wall 16 in contact with the outlet cells 14 towards the inlet cells 12), with drying and firing, to form as a result the downstream catalyst layer 8b inside the partition wall 16. A filter catalyst according to Example 1 was thus obtained.

An elemental analysis of a cross-section of the obtained filter catalyst revealed that the total amount of the Fe-supporting β-zeolite was present in a portion (hereafter referred to as first stage) corresponding to 50% of the length L of the cordierite substrate, from the exhaust gas inflow end of the substrate towards the downstream side, being a portion corresponding to 50% of the thickness of the partition wall 16 from the surface of the partition wall 16 in contact with the inlet cells 12 towards the outlet cells 14 (see FIG. 5A). Further, the total amount of Cu-supporting SAPO was found to be present in a portion (hereafter referred to as second stage) corresponding to 50% of the length L of the cordierite substrate from the exhaust gas outflow end of the substrate towards the upstream side, being a portion corresponding to 50% of the thickness of the partition wall 16 from the surface of the partition wall 16 in contact with the outlet cells 14 towards the inlet cells 12 (see FIG. 5A). The coating amount of the first stage and the second stage of the filter catalyst is 75 g per L of substrate.

Example 2

In the present example the addition amount of the organic polymer to the slurries was modified to make the viscosities of the slurry A and the slurry B different from those of Example 1. The degree of permeation of the wash coat layer in the thickness direction of the partition wall 16 was rendered different from that of Example 1 by modifying the air blowing conditions. Specifically, the slurry B was caused to permeate over a portion corresponding to 50% of the length L of the cordierite substrate, from the exhaust gas inflow end of the substrate towards the downstream side, and being a portion corresponding to 80% of the thickness of the partition wall 16, from the surface of the partition wall 16 in contact with the inlet cells 12 towards the outlet cells 14 (see FIG. 5B). The slurry A was caused to permeate over a portion corresponding to 50% of the length L of the cordierite substrate, from the exhaust gas outflow end of the substrate towards the upstream side, and being a portion corresponding to 80% of the thickness of the partition wall 16 from the surface of the partition wall 16 in contact with the outlet cells 14 towards the inlet cells 12 (see FIG. 5B). A filter catalyst was produced according to a procedure in which other conditions were identical to those of Example 1.

An elemental analysis of a cross-section of the obtained filter catalyst revealed that 80% of the total amount of the Fe-supporting β-zeolite was present in a portion corresponding to 50% of the length L of the cordierite substrate, from the exhaust gas inflow end of the substrate towards the downstream side, being a portion corresponding to 80% of the thickness of the partition wall 16 from the surface of the partition wall 16 in contact with the inlet cells 12 towards the outlet cells 14. Further, 80% of the total amount of Cu-supporting SAPO was found to be present in a portion corresponding to 50% of the length L of the cordierite substrate from the exhaust gas outflow end of the substrate towards the upstream side, being a portion corresponding to 80% of the thickness of the partition wall 16 from the surface of the partition wall 16 in contact with the outlet cells 14 towards the inlet cells 12.

Example 3

In the present example the addition amount of the organic polymer to the slurries was modified to make the viscosities of the slurry A and the slurry B different from those of Example 1. The degree of permeation of the wash coat layer in the thickness direction of the partition wall 16 was rendered different from that of Example 1 by modifying the air blowing conditions. Specifically, the slurry B was caused to permeate over a portion corresponding to 80% of the length L of the cordierite substrate, from the exhaust gas inflow end of the substrate towards the downstream side, and being a portion corresponding to 50% of the thickness of the partition wall 16, from the surface of the partition wall 16 in contact with the inlet cells 12 towards the outlet cells 14 (see FIG. 5C). The slurry A was caused to permeate over a portion corresponding to 80% of the length L of the cordierite substrate, from the exhaust gas outflow end of the substrate towards the upstream side, and being a portion corresponding to 50% of the thickness of the partition wall 16 from the surface of the partition wall 16 in contact with the outlet cells 14 towards the inlet cells 12 (see FIG. 5C). A filter catalyst was produced according to a procedure in which other conditions were identical to those of Example 1.

An elemental analysis of a cross-section of the obtained filter catalyst revealed that the total amount of the Fe-supporting β-zeolite was present in a portion corresponding to 80% of the length L of the cordierite substrate, from the exhaust gas inflow end of the substrate towards the downstream side, being a portion corresponding to 50% of the thickness of the partition wall 16 from the surface of the partition wall 16 in contact with the inlet cells 12 towards the outlet cells 14. Further, the total amount of Cu-supporting SAPO was found to be present in a portion corresponding to 80% of the length L of the cordierite substrate from the exhaust gas outflow end of the substrate towards the upstream side, being a portion corresponding to 50% of the thickness of the partition wall 16 from the surface of the partition wall 16 in contact with the outlet cells 14 towards the inlet cells 12.

Example 4

In the present example the addition amount of the organic polymer to the slurries was modified to make the viscosities of the slurry A and the slurry B different from those of Example 1. The degree of permeation of the wash coat layer in the thickness direction of the partition wall 16 was rendered different from that of Example 1 by modifying the air blowing conditions. Specifically, the slurry B was caused to permeate over a portion corresponding to 80% of the length L of the cordierite substrate, from the exhaust gas inflow end of the substrate towards the downstream side, and being a portion corresponding to 80% of the thickness of the partition wall 16, from the surface of the partition wall 16 in contact with the inlet cells 12 towards the outlet cells 14 (see FIG. 5D). The slurry A was caused to permeate over a portion corresponding to 80% of the length L of the cordierite substrate, from the exhaust gas outflow end of the substrate towards the upstream side, and being a portion corresponding to 80% of the thickness of the partition wall 16 from the surface of the partition wall 16 in contact with the outlet cells 14 towards the inlet cells 12 (see FIG. 5D). A filter catalyst was produced according to a procedure in which other conditions were identical to those of Example 1.

An elemental analysis of a cross-section of the obtained filter catalyst revealed that 80% of the total amount of the Fe-supporting β-zeolite was present in a portion corresponding to 80% of the length L of the cordierite substrate, from the exhaust gas inflow end of the substrate towards the downstream side, being a portion corresponding to 80% of the thickness of the partition wall 16 from the surface of the partition wall 16 in contact with the inlet cells 12 towards the outlet cells 14. Further, 80% of the total amount of Cu-supporting SAPO was found to be present in a portion corresponding to 80% of the length L of the cordierite substrate from the exhaust gas outflow end of the substrate towards the upstream side, being a portion corresponding to 80% of the thickness of the partition wall 16 from the surface of the partition wall 16 in contact with the outlet cells 14 towards the inlet cells 12.

Example 5

In the present example, an identical material (slurry A) alone was used in both the upstream catalyst layer 18*a* and the downstream catalyst layer 18*b*, but the maximum allowable adsorption amount of ammonia was set to vary by using different wash coating amounts. Specifically, the exhaust gas inflow end a cordierite substrate was wash-coated using 240 g of the slurry A. The slurry A was next caused to permeate, by air blowing, into the partition wall 16 (in a portion (see FIG. 5A) corresponding to 50% of the length L of the cordierite substrate from the exhaust gas inflow end of the substrate towards the downstream side, being a portion corresponding to 50% of the thickness of the partition wall 16, from the surface of the partition wall 16 in contact with the inlet cells 12 towards the outlet cells 14), with drying and firing, to form as a result the upstream catalyst layer 18*a* inside the partition wall 16. The exhaust gas outflow end of the above cordierite substrate was wash-coated with 270 g of the slurry A. The slurry A was next caused to permeate, by air blowing, into the partition wall 16 (in a portion (see FIG. 5A) corresponding to 50% of the length L of the cordierite substrate from the exhaust gas outflow end of the substrate towards the upstream side, being a portion corresponding to 50% of the thickness of the partition wall 16, from the surface of the partition wall 16 in contact with the outlet cells 14 towards the inlet cells 12), with drying and firing, to form as a result the downstream catalyst layer 18*b* inside the partition wall 16. A filter catalyst according to Example 5 was thus obtained.

An elemental analysis of a cross-section of the obtained filter catalyst revealed that the total amount of first-stage Cu-supporting SAPO was present in a portion corresponding to 50% of the length L of the cordierite substrate, from the exhaust gas inflow end of the substrate towards the downstream side, being a portion corresponding to 50% of the thickness of the partition wall 16 from the surface of the partition wall 16 in contact with the inlet cells 12 towards the outlet cells 14 (see FIG. 5A). Further, the total amount of second-stage Cu-supporting SAPO was found to be present in a portion corresponding to 50% of the length L of the cordierite substrate from the exhaust gas outflow end of the substrate towards the upstream side, being a portion corresponding to 50% of the thickness of the partition wall 16 from the surface of the partition wall 16 in contact with the outlet cells 14 towards the inlet cells 12 (see FIG. 5A). The first-stage coating amount of the filter is 70 g per L of substrate, and the second-stage coating amount is 80 g per L of substrate.

Example 6

A filter catalyst was produced in accordance with the same procedure as that of Example 5, but herein the air blow conditions during wash coating were modified. An elemental analysis of a cross-section of the obtained filter catalyst revealed that 80% of the total amount of first-stage Cu-supporting SAPO was present in a portion corresponding to 50% of the length L of the cordierite substrate, from the exhaust gas inflow end of the substrate towards the downstream side, being a portion corresponding to 80% of the thickness of the partition wall 16 from the surface of the partition wall 16 in contact with the inlet cells 12 towards the outlet cells 14 (see FIG. 5B). Further, 80% of the total amount of second-stage Cu-supporting SAPO was found to be present in a portion corresponding to 50% of the length L of the cordierite substrate from the exhaust gas outflow end of the substrate towards the upstream side, being a portion corresponding to 80% of the thickness of the partition wall 16 from the surface of the partition wall 16 in contact with the outlet cells 14 towards the inlet cells 12 (see FIG. 5B).

Example 7

In the present example, a filter catalyst was produced under conditions identical to those of Example 3, but herein the exhaust gas inflow end of the cordierite substrate was wash-coated using 242 g of the slurry A, and the exhaust gas outflow end of the substrate was wash-coated using 268 g of the slurry A. An elemental analysis of a cross-section of the obtained filter catalyst revealed that the total amount of the Cu-supporting SAPO contained in the slurry A with which the exhaust gas inflow end of the substrate was wash-coated was present in a portion corresponding to 80% of the length L of the cordierite substrate, from the exhaust gas inflow end of the substrate towards the downstream side, being a portion corresponding to 50% of the thickness of the partition wall 16 from the surface of the partition wall 16 in contact with the inlet cells 12 towards the outlet cells 14 (see FIG. 5C). Further, the total amount of the Cu-supporting SAPO contained in the slurry A with which the exhaust gas outflow end of the substrate cordierite was wash-coated was found to be present in a portion corresponding to 80% of the length L of the substrate from the exhaust gas outflow end of the substrate towards the upstream side, being a portion corresponding to 50% of the thickness of the partition wall 16 from the surface of the partition wall 16 in contact with the outlet cells 14 towards the inlet cells 12 (see FIG. 5C).

Example 8

A filter catalyst was produced in accordance with the same procedure as that of Example 7, but herein the air blow conditions during wash coating were modified. An elemental analysis of a cross-section of the obtained filter catalyst revealed that 80% of the total amount of the Cu-supporting SAPO contained in the slurry A initially charged was present in a portion corresponding to 80% of the length L of the cordierite substrate, from the exhaust gas inflow end of the substrate towards the downstream side, being a portion corresponding to 80% of the thickness of the partition wall 16 from the surface of the partition wall 16 in contact with the inlet cells 12 towards the outlet cells 14 (see FIG. 5D). Further, 80% of the total amount of Cu-supporting SAPO contained in the slurry A charged the second time was found to be present in a portion corresponding to 80% of the length L of the cordierite substrate from the exhaust gas outflow end of the substrate towards the upstream side, being a portion corresponding to 80% of the thickness of the partition wall 16 from the surface of the partition wall 16 in contact with the outlet cells 14 towards the inlet cells 12 (see FIG. 5D).

Comparative Example 1

In the present example a filter catalyst was produced by immersing a cordierite substrate in the slurry A and removing the excess slurry through air blowing, followed by drying and firing.

Comparative Example 2

In the present example a filter catalyst was produced by immersing a cordierite substrate in the slurry B and removing the excess slurry through air blowing, followed by drying and firing.

Comparative Example 3

In the present example, 100 g of a Cu-supporting SAPO and 100 g of a Fe-supporting (3-zeolite were charged into a solution resulting from mixing 350 g of pure water and 200 g of a $SiO_2$ sol (SNOWTEX S, by Nissan Chemical Industries Ltd.), with stirring and milling of the whole, to yield a slurry C. A filter catalyst was produced by immersing a cordierite substrate in the slurry C and removing the excess slurry through air blowing, followed by drying and firing.

The maximum allowable adsorption amounts of ammonia at a first stage of the filter catalyst of each example (portion corresponding to 50% of the length L of the substrate, from the exhaust gas inflow end of the filter towards the downstream side) and at the second stage (portion corresponding to 50% of the length L of the substrate from the exhaust gas outflow end of the filter towards the upstream side) were calculated on the basis of the usage amount and a basic characteristic (saturated adsorption amount) of the materials that were used. The results are given in Table 1.

TABLE 1

| | Maximum allowable adsorption amount (mmol/L) | | | Equivalent ratio 0.5 | | Equivalent ratio 1.0 | |
|---|---|---|---|---|---|---|---|
| | First-stage A | Second-stage B | B/A ratio | NOx purification rate (%) | $NH_3$ concentration (ppm) | NOx purification rate (%) | $NH_3$ concentration (ppm) |
| Example 1 | 74.8 | 112.2 | 1.5 | 86 | 3 | 98 | 20 |
| Example 2 | 74.8 | 112.2 | 1.5 | 85 | 3 | 97 | 22 |
| Example 3 | 88.825 | 98.175 | 1.1 | 83 | 3 | 97 | 21 |
| Example 4 | 88.825 | 98.175 | 1.1 | 82 | 3 | 98 | 20 |
| Example 5 | 105.468 | 118.932 | 1.1 | 78 | 2 | 99 | 15 |
| Example 6 | 52.734 | 59.466 | 1.1 | 78 | 1 | 99 | 16 |
| Example 7 | 106.59 | 117.81 | 1.1 | 79 | 3 | 98 | 19 |

TABLE 1-continued

| | Maximum allowable adsorption amount (mmol/L) | | | Equivalent ratio 0.5 | | Equivalent ratio 1.0 | |
|---|---|---|---|---|---|---|---|
| | First-stage A | Second-stage B | B/A ratio | NOx purification rate (%) | NH$_3$ concentration (ppm) | NOx purification rate (%) | NH$_3$ concentration (ppm) |
| Example 8 | 106.59 | 117.81 | 1.1 | 77 | 2 | 99 | 18 |
| Comp. ex. 1 | 112.5 | 112.5 | 1 | 70 | 2 | 98 | 20 |
| Comp. ex. 2 | 75 | 75 | 1 | 85 | 3 | 88 | 80 |
| Comp. ex. 3 | 93.75 | 93.75 | 1 | 73 | 3 | 97 | 36 |

The NOx purification ability of the filter catalysts of the examples was evaluated. Specifically, the filter catalyst of each example having been subjected beforehand to hydrothermal aging at 650° C. for 50 hours was fitted to the exhaust pipe of a 2.2 L common-rail diesel engine; exhaust gas was caused to flow through the filter catalyst, and the NOx purification rate was measured. An oxidation catalyst was disposed in the exhaust pipe, upstream of the filter catalyst, in order to remove unburned diesel oil discharged by the engine. An injector was disposed in the exhaust pipe upstream of the filter catalyst, and aqueous urea, as a reducing agent solution for generating ammonia, was added from the injector. The aqueous urea was adjusted so that the equivalent ratio of NH$_3$ with respect to NOx was 0.5 or 1. The NOx purification rate (%) was calculated herein on the basis of "(NOx concentration (ppm) of gas entering the catalyst−NOx concentration (ppm) of gas leaving the catalyst)/NOx concentration (ppm) of gas entering the catalyst"× 100. The NH$_3$ concentration was measured downstream of the filter catalyst, and ammonia slip was evaluated under various conditions in conjunction with the NOx purification rate. The evaluation temperature was set to 450° C. The results are given in Table 1.

As Table 1 reveals, the filter catalysts in Comparative examples 1 and 3, in which there was no difference in the maximum allowable adsorption amount of ammonia between the first stage and the second stage, exhibited low NOx purification rate and poor NOx purification performance, in a case where the NH$_3$/NOx equivalent ratio was 0.5 (relatively little addition of aqueous urea). Although the filter catalyst of Comparative example 2 exhibited a higher NOx purification rate than those of Comparative examples 1 and 3, the NOx purification rate was lower than in other samples, and significant ammonia slip was likewise observed, when the NH$_3$/NOx equivalent ratio was 1 (relatively large addition of aqueous urea). In the filter catalysts according to Examples 1 to 8, where the maximum allowable adsorption amount of ammonia in the second stage was set to be larger than that in the first stage, by contrast, the NOx purification rate in a case where the NH$_3$/NOx equivalent ratio was 0.5 was found to be higher than that in Comparative examples 1 and 3. The filter catalysts of Examples 1 to 8 delivered thus superior NOx purification performance. Also in a case where the NH$_3$/NOx equivalent ratio was 1, the NOx purification rate was higher than that in Comparative example 2, while the ammonia slip amount was kept comparatively low. These results revealed that a high NOx purification rate can be achieved, while suppressing ammonia slip, by setting the maximum allowable adsorption amount of ammonia on the downstream portion of the filter to be larger than that in the upstream portion.

Although several variations of the filter 10 and the exhaust gas purification device 100 provided with the filter 10 have been illustrated above, the structures of the filter 10 and of the exhaust gas purification device 100 are not limited to those of any one of the embodiments described above.

The exhaust gas purification device 100 is particularly suitable as a device for purification of harmful components in exhaust gas of comparatively low exhaust temperature, for instance in diesel engines. However, the exhaust gas purification device 100 according to the present invention is not limited to being used for purification of harmful components in exhaust gas of diesel engines, and can be used in various applications that involve purifying harmful components in exhaust gas emitted by other engines (for instance, gasoline engines).

INDUSTRIAL APPLICABILITY

The present invention allows providing a high-performance exhaust gas purification material that combines NOx purification and ammonia emission suppression at a high level, the material being provided with a particulate filter that contains an SCR catalyst.

The invention claimed is:

1. An exhaust gas purification material that is disposed in an exhaust passage of an internal combustion engine, and purifies exhaust gas emitted by the internal combustion engine, the exhaust gas purification material comprising:
    a particulate filter that traps particulate matter in the exhaust gas and contains an SCR catalyst for adsorbing ammonia and reducing NOx in the exhaust gas,
    wherein an upstream portion of the filter including an exhaust gas inlet-side end, and a downstream portion of the filter including an exhaust gas outlet-side end, each contain an SCR catalyst,
    a maximum allowable adsorption amount of ammonia adsorbable by the filter differs between the upstream portion and the downstream portion,
    a maximum allowable adsorption amount of ammonia A in the upstream portion is smaller than a maximum allowable adsorption amount of ammonia B in the downstream portion (A<B),
    a composition of the SCR catalyst in the upstream portion is identical to a composition of the SCR catalyst in the downstream portion, and
    a content of the SCR catalyst per L of substrate in the upstream portion is smaller than a content of the SCR catalyst per L of substrate in the downstream portion.

2. The exhaust gas purification material according to claim 1, wherein a value of ratio (B/A) of the maximum allowable adsorption amount of ammonia A in the upstream portion and the maximum allowable adsorption amount of ammonia B in the downstream portion satisfies 1.1≤(B/A).

3. The exhaust gas purification material according to claim 1, wherein a value of ratio (B/A) of the maximum allowable adsorption amount of ammonia A in the upstream portion and the maximum allowable adsorption amount of ammonia B in the downstream portion satisfies 1.5≤(B/A).

4. The exhaust gas purification material according to claim 1,
wherein the upstream portion includes a portion corresponding to at least 20% of the length of the filter from the exhaust gas inlet-side end of the filter towards the exhaust gas outlet, and
the downstream portion includes a portion corresponding to at least 20% of the length of the filter from the exhaust gas outlet-side end of the filter towards the exhaust gas inlet.

5. The exhaust gas purification material according to claim 1, wherein the filter includes:
a substrate of wall flow structure, having inlet cells in which only an exhaust gas inflow end is open, outlet cells adjacent to the inlet cells and in which only an exhaust gas outflow end is open, and a porous partition wall that separates the inlet cells and the outlet cells;
an upstream catalyst layer provided within the partition wall in the upstream portion and containing an SCR catalyst; and
a downstream catalyst layer provided within the partition wall in the downstream portion and containing an SCR catalyst,
wherein the upstream catalyst layer is formed in such a manner that 80 mass % or more of the total amount of the SCR catalyst is present in a portion corresponding to up to 80% of the thickness of the partition wall, from a surface of the partition wall in contact with the inlet cells towards the outlet cells, and
the downstream catalyst layer is formed in such a manner that 80 mass % or more of the total amount of the SCR catalyst is present in a portion corresponding to up to 80% of the thickness of the partition wall, from the surface of the partition wall in contact the outlet cells towards the inlet cells.

6. An exhaust gas purification device, comprising:
the exhaust gas purification material according to claim 1; and
reducing agent solution supply part for supplying a reducing agent solution for generating ammonia, from upstream of the exhaust gas purification material in the exhaust passage.

* * * * *